United States Patent [19]

Aldrich

[11] Patent Number: 4,589,281

[45] Date of Patent: May 20, 1986

[54] MATERIAL LEVEL DETECTOR AND CONTROL

[75] Inventor: Joe L. Aldrich, Kingwood, Tex.

[73] Assignee: Keystone International, Inc., Houston, Tex.

[21] Appl. No.: 653,028

[22] Filed: Sep. 20, 1984

[51] Int. Cl.⁴ .............................................. G01F 23/26
[52] U.S. Cl. ................................. 73/290 R; 73/304 R; 73/304 C
[58] Field of Search ............. 73/290 R, 290 V, 304 R, 73/304 C; 340/617, 620; 361/284; 324/61 P

[56] References Cited

U.S. PATENT DOCUMENTS

| | | |
|---|---|---|
| 2,381,505 | 8/1945 | Lindholm . |
| 2,621,517 | 5/1952 | Sontheimer . |
| 2,674,396 | 4/1954 | Peterson . |
| 2,774,959 | 12/1956 | Edelman et al. . |
| 2,923,880 | 2/1960 | Mayes ............................... 73/304 C |
| 2,932,970 | 4/1960 | Zito . |
| 2,955,466 | 10/1960 | Coles . |
| 3,036,736 | 5/1962 | Murphy et al. . |
| 3,140,608 | 7/1964 | Clark . |
| 3,188,865 | 6/1965 | Frost et al. ........................ 324/61 P |
| 3,277,711 | 10/1966 | Roberge . |
| 3,394,589 | 7/1968 | Tomioka ............................. 73/290 V |
| 3,404,963 | 10/1968 | Fritsche et al. . |
| 3,653,543 | 4/1972 | Preikschat . |
| 3,706,980 | 12/1972 | Maltby ................................. 340/620 |
| 3,807,231 | 4/1974 | Spaw . |
| 3,862,571 | 1/1975 | Vogel . |
| 3,864,974 | 2/1975 | Rauchwerger . |
| 3,879,644 | 4/1975 | Maltby . |
| 3,935,970 | 2/1976 | Spaw . |
| 3,995,212 | 11/1976 | Ross ................................... 73/304 R |
| 4,110,740 | 8/1978 | Akita et al. ......................... 340/620 |
| 4,169,543 | 10/1979 | Hall . |
| 4,222,267 | 9/1980 | Aldrich . |
| 4,226,118 | 10/1980 | Aldrich . |
| 4,240,285 | 12/1980 | Langdon ............................. 73/290 V |
| 4,295,370 | 10/1981 | Bristol ................................ 361/284 |
| 4,329,875 | 5/1982 | Nolting et al. ..................... 73/290 V |
| 4,347,741 | 9/1982 | Geiger ................................ 324/61 P |
| 4,444,051 | 4/1984 | Yamaki et al. .................... 73/304 C |

Primary Examiner—Robert I. Smith
Assistant Examiner—David R. Schuster
Attorney, Agent, or Firm—Browning, Bushman, Zamecki & Anderson

[57] ABSTRACT

Disclosed is a monitoring system and method for detecting the presence or absence of material at a location. The apparatus may generally be constructed to include a sensing unit, including an antenna probe for positioning at the location wherein material is to be detected, and a control unit for responding to signals from the sensing unit indicating the presence of material at the antenna probe. The control unit may include an indicator to inform an operator of the presence or absence of material at the antenna probe, and also an output which enables peripheral equipment to operate only under selected conditions at the antenna probe. The sensing signal from the sensing unit is dc, with fluctuations indicating the presence of material at the antenna probe. The sensing signal may be communicated a considerable distance to the control unit over ordinary electrical lead lines without electrical shielding, and the control unit responds to a break in such communication lines by not permitting enabling of such peripheral equipment.

43 Claims, 5 Drawing Figures

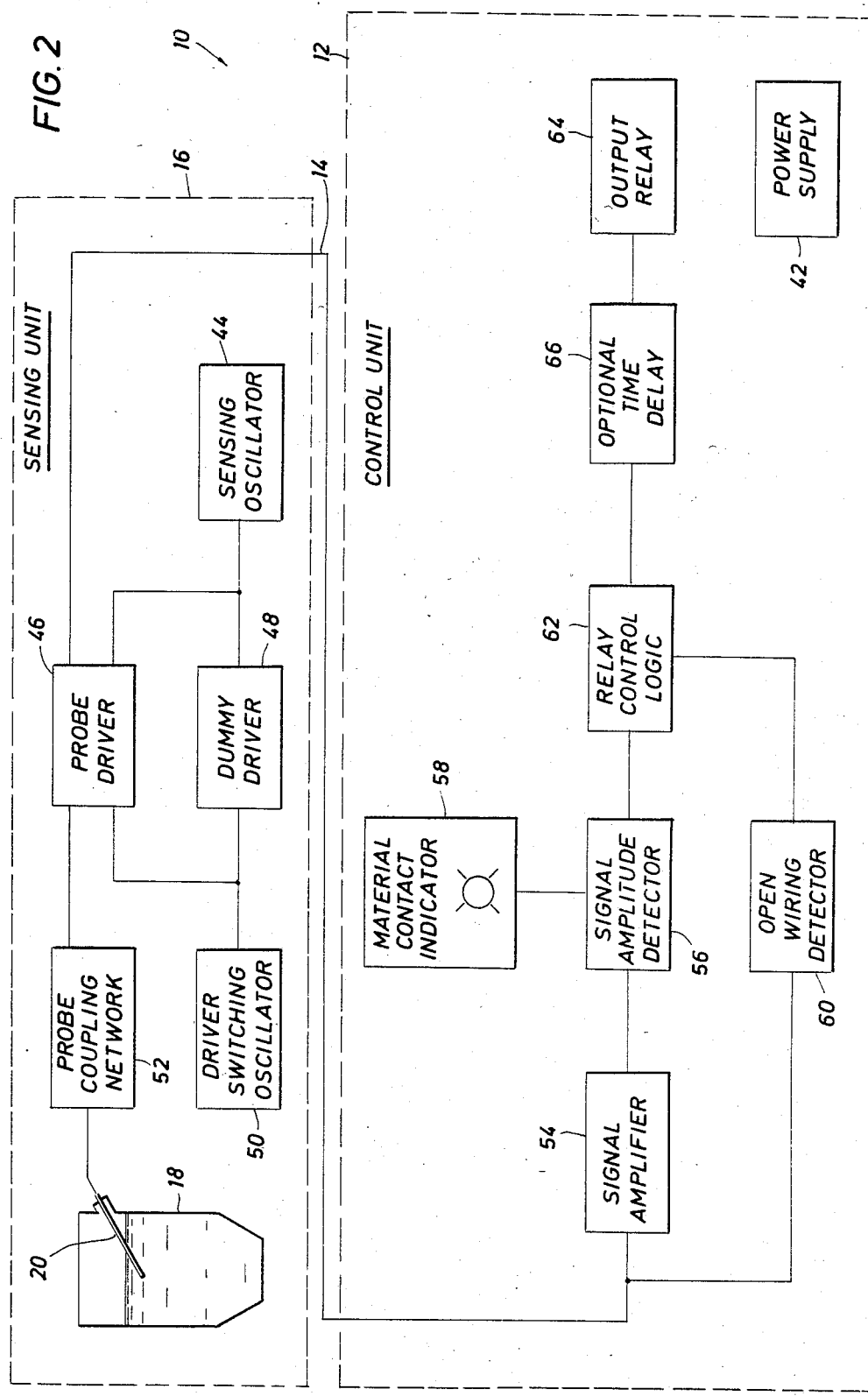

MATERIAL LEVEL DETECTOR AND CONTROL

BACKGROUND OF THE INVENTION

1. Field of the Invention

The present invention pertains to apparatus and methods for detecting the presence or absence of material at a predetermined location. More particularly, the present invention relates to systems for determining the amount of material accumulated at a locale. Apparatus and methods of the present invention find particular application in cases of material storage in containers, such as bins, wherein the amount of material present may be determined by detecting the level of the material in the bin. Systems for adding material to, or removing material from, such a container may be operated, or at least enabled, by the present invention based on the determination by the present invention of conditions within the container.

2. Description of the Prior Art

Several prior art systems for measuring material levels in bins include the use of mechanical probes which extend into the bin. Such a probe is made to vibrate, and the physical characteristics of the elastic disturbances, which are affected by the quantity of material present about the probe, are analyzed in terms of the quantity of material present.

Other prior art devices rely upon the variation of one or more electrical properties affected due to the presence of material at different levels within the bin. Thus, capacitive reactance of one or more probes may be affected to signal the amount of material present. The operation of an oscillator circuit, including a resonant probe, may be affected to operate a control system in response to the presence of material near the resonant probe.

U.S. Pat. Nos. 3,807,231 and 3,935,970 disclose a measuring system and apparatus wherein the reactance of an antenna probe varies as a function of the level of material in the container adjacent the antenna. The antenna reactance controls the frequency of a transmitter signal, which is then combined with a constant frequency reference signal. The frequency of the resulting difference signal is used to operate a material level indicator and to provide control information for operating automatic systems for controlling the material level.

An amplitude-modulated detector circuit is disclosed in U.S. Pat. No. 4,169,543. There, a crystal-controlled oscillator generates a constant-amplitude signal which is communicated through a load resistor to an antenna probe circuit. Variations in the amplitude of this loaded signal, due to the presence of material to be detected about the antenna probe, are reflected in variations in the value of a dc voltage level. The variable voltage level is combined with a reference voltage level and the resulting signal is communicated to a switching circuit. The switching circuit provides an output signal depending on a comparison between the combined signal and a second reference level.

A detector circuit is disclosed in U.S. Pat. No. 4,222,267 wherein an antenna probe forms an arm of an impedance bridge on which is impressed a constant-frequency, constant-amplitude signal generated by an oscillator. Presence of material at the antenna probe affects the impedance of the bridge, and accordingly, alters the amplitude of the signal which is then converted to a dc voltage level. A switching circuit includes a comparator which compares the dc voltage level with a reference level, and produces an output signal indicative of the presence or absence of material at the antenna probe. The sensitivity of the switching circuit may be adjusted to accommodate variations in the effect different materials to be detected may have on the impedance of the antenna probe. The switching circuit itself is equipped with a light-emitting diode, and functions as a calibration circuit for the detector circuitry.

U.S. Pat. No. 4,226,118 discloses a frequency-modulated continuous level detector including a switch-adjusted sensitivity control capability and an on-board test circuit for both adjusting the sensitivity of, and zeroing, the detector circuitry. A reference oscillator and an antenna oscillator each generate a signal of a predetermined base frequency, with the antenna oscillator output being impressed on an antenna probe extending into the sensing area. The outputs of both oscillators are compared in a differencer circuit which produces an output signal whose frequency is equal to the difference between the frequencies of the two oscillator circuit output signals. The impedance of the antenna probe is altered in proportion to the extent of the antenna immersed in material in the sensing area to alter the frequency of the output signal from the antenna oscillator accordingly. The differencer output signal may be converted to a voltage level proportional to the extent material is present at the antenna probe.

It is desirable and particularly advantageous in certain applications for an operator to be able to monitor a detection system at a location removed from the bin or other container, for example, whose material level is of interest. Providing such a detection system in the form of a sensing unit located at the bin and a control unit that may be positioned at some distance would permit such operation. However, separation between the sensing unit and the control unit may be limited by the length of electrical connectors over which the sensing signal between the components can practically travel. High frequency sensing signals may be subject to noise and other interference, and so must be communicated over electrically shielded lines, for example. The present invention provides a system which utilizes a sensing signal which may be communicated over extended distances without the need for electrically shielded cable, for example. Additionally, in the event of a break in the communication line between the sensing unit and the control unit, the present invention may assume a configuration in which peripheral equipment, to add material to a container or remove material therefrom, for example, would not be enabled.

SUMMARY OF THE INVENTION

The present invention provides detector and control apparatus for monitoring the presence or absence of material at a location, and may be constructed with its components generally divided between a sensing unit and a control unit which may be displaced from the sensing unit. The sensing unit includes an antenna probe for placement at the location where the presence or absence of material is to be monitored, and provides a data signal to the control unit indicative of the presence or absence of material at the antenna probe. The control unit includes a power supply for providing electrical energy to the sensing unit by means of a connector. The data signal is generated in the form of fluctuations in dc current drawn by the sensing unit from the power supply as the rate of energy consumption by the sensing unit is made to vary in the presence of detectable material at the antenna probe.

In the sensing unit, a sensing oscillator generates a relatively high frequency square wave sensing signal which is applied to two drivers comprising gates. A probe driver is coupled by capacitive coupling to the antenna probe so that, when the probe driver gate is enabled, the probe driver communicates a square wave output signal to the antenna probe of the same frequency as the sensing signal frequency. A dummy driver having an open output serves as a reference and, when enabled, produces a square wave output signal of the same frequency as the sensing signal. Switching apparatus includes a switching oscillator which generates a square wave switching signal of relatively low frequency, and in any event lower than the sensing signal frequency. The switching signal combines with the sensing signal to enable each of the drivers during one-half cycle of the switching signal, and then at the frequency of the sensing signal so that each driver periodically generally provides the same relatively high frequency output square wave signal. An inverter is interposed between the switching oscillator and one or the other of the drivers to invert the switching signal so that the two drivers are so alternately enabled by the switching signal combining with the sensing signal with the result that the driver output signals are mutually 180° out of phase.

As first one and then the other of the drivers is so enabled to output a relatively high frequency square wave signal, energy consumption by the sensing unit, and particularly the sensing oscillator, is determined in part by disposition of the generated driver output signal. When no detectable material is present at the antenna probe, both the probe driver and the dummy driver effectively output their respective signals to an open antenna with virtually the same energy consumption by the sensing oscillator. Material is detectable at the antenna probe by providing a load which, when the high frequency square wave is impressed on the antenna probe from the probe driver, causes a drain of electrical energy through the driver from the sensing oscillator. In that case, the rate of energy consumption by the sensing unit fluctuates at the switching signal frequency, and the fluctuations appear in the electrical energy provided along the connector from the power supply of the control unit.

In the control unit, such fluctuations in the energy consumption rate are communicated to an amplifier which provides a constant output signal in the absence of such fluctuations with no material detectable at the antenna probe, but which provides a square wave output signal responsive to the presence of such fluctuations, the square wave output being of the same switching frequency. The amplifier may be equipped with a sensitivity control which varies the positive pulses of the square wave output from the amplifier. A detector receives and integrates the amplifier output signal, comparing the integration with a reference. Whenever the resulting integration voltage value exceeds a reference, the detector provides a detector output signal which may actuate a display of a material contact indicator, revealing that detectable material is present at the antenna probe.

The detector output signal may also be received by a logic circuit, which provides an output enabling signal under certain conditions. For example, the logic circuit may be configured to provide an enabling signal only when material is detected at the antenna probe, or may be configured to provide an enabling signal only when material is not detected at the antenna probe. Additionally, an open connection detector may be provided as part of the control unit for monitoring the connector between the control unit and the sensing unit. When the open connection detector determines that no energy is being transmitted over the connector, indicating that the connector is open, the open connection detector provides a voltage level detector signal to the logic circuit, which responds by providing no output enabling signal regardless of whether material is detectable at the antenna probe.

An output relay may be provided for receiving any enabling signal from the logic circuit to actuate the relay. Peripheral circuitry may be operated by the relay operating in response to a logic circuit enabling signal. A time delay is provided to selectively delay change in configuration of the relay in response to a change in status of the enabling signal output from the logic circuit.

Peripheral equipment may be operated, or be permitted to operate, by the detector and control system of the present invention. For example, operation of the relay in response to a logic circuit enabling signal provided in conjunction with the system detecting the presence of material at the antenna probe may remove material from the vicinity of the probe; also, the logic circuitry may be configured so that the relay is actuated when no material is detected at the probe so that peripheral equipment may be operated to add material to the vicinity of the probe.

The data signal provided by the sensing unit is generally a low frequency fluctuating dc signal which may be communicated over lead lines which are not electrically shielded, and for considerable distances, since the fluctuations occur in the power signal provided by the control unit to the sensing unit and are not normally subject to noise or other interference. The present invention may be constructed with an open connection detector, whereby, if the connection between the control unit and the sensing unit is open by accident, for example, the logic circuit is directed to output no enabling signal to actuate the relay, whereby peripheral equipment to add material to the vicinity of the probe or to remove material therefrom is maintained inoperable.

BRIEF DESCRIPTION OF THE DRAWINGS

FIG. 2 is a block diagram indicating features of the present invention;

DETAILED DESCRIPTION OF THE PREFERRED EMBODIMENT

Figure 1:
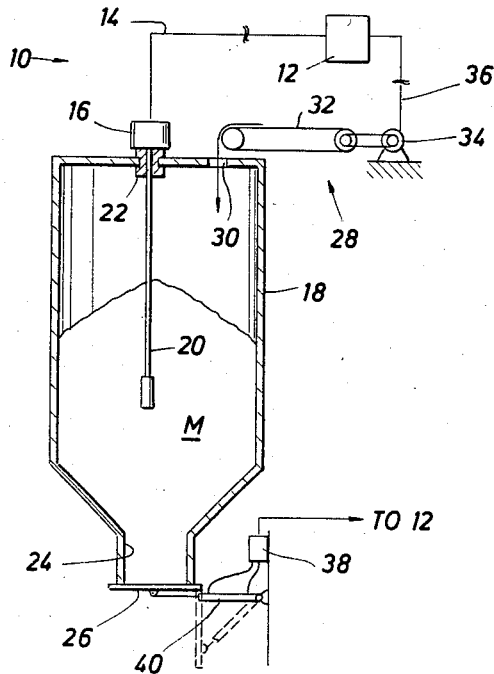
FIG. 1 is a side elevation in partial section and schematic of a material container with a monitoring system according to the present invention connected to a material feed mechanism.

In FIG. 1, the monitoring apparatus of the present invention, shown generally at 10, includes a control unit 12 connected by an electrical communication line 14 to a remote sensing unit 16, mounted at the top of a bin, or material container, 18 containing a quantity of material M. An antenna probe 20 extends downwardly from the main body of the remote sensing unit 16 through an insulating connector 22 by which the sensing unit is mounted on the bin 18 with the antenna insulated from the bin walls. The antenna 20 may be in the form of a rigid rod or other appropriate conducting material suspended to some point within the bin.

The bin 18 is of conventional construction, having a dispensing opening 24 at its lower end which is covered by a door 26. When the door 26 is open, as indicated by the dashed lines, material within the bin 18 flows by gravity from the opening 24.

A material feed system, shown generally at 28, is located at the top of the bin 18 to introduce material into the bin through an opening 30. The feed system 28 is shown schematically to include a conveyor belt 32 operated by a motor 34 which in turn is joined by an appropriate connector 36 to the control unit 12. Thus, the detector and control system 10 may operate the feed system 28 in response to the remote sensing unit 16 detecting material at a given level within the bin 18, whereby the control unit 12 may, for example, cause the feed system to cease adding material to the bin. Similarly, the detector and control system 10 of the present invention may be operatively connected to an appropriate motive source and linkage system, such as a fluid pressure system 38 and fluid pressure piston-and-cylinder assembly 40, operable to selectively open and close the door 26. The control unit 12 could effect opening and closing of the door 26 in response to the remote sensing unit 16 detecting material at a selected level within the bin 18. In such fashion, for example, detectors according to the present invention may be utilized to control the amount of material maintained within a container.

The electrical circuitry of the level detector and control apparatus 10 of the present invention is indicated generally in FIG. 2. The control unit 12 includes a power supply 42 for providing electrical energy to operate the various components of the system, and particularly providing a dc voltage to the electrical communication line 14 linking the control unit with the sensing unit. As discussed in more detail hereinafter, variation in the current drawn through the conducting line 14 by the sensing unit 16 is detected at the control unit as an indication of the presence of material at the antenna probe 20 within the bin 18.

In the sensing unit 16, a sensing oscillator 44 generates a high frequency square wave (typically 100 kHz) which is applied to inputs of a probe driver 46 and of a dummy driver 48, respectively. Each of the drivers 46 and 48 comprises a gate, which is periodically enabled in response to a low frequency square wave (typically 60 Hz) generated by a driving switching oscillator 50 and applied to second inputs to each of the driver gates. The switching signal from the oscillator 50 is inverted before such application at one or the other of the drivers 46 or 48. Consequently, the two drivers 46 and 48 alternately receive the positive portion of the cycle of the output signal from the switching oscillator 50. During one half of each switching oscillator signal cycle, the probe drive 46 generates a square wave output at the frequency of the sensing oscillator output while the dummy driver 48 outputs a constant voltage. During the next half cycle of the switching oscillator signal, the dummy driver 48 outputs a high frequency square wave while the output from the probe driver 46 is constant. The dummy driver 48 has an open output to serve as a reference, or base. The probe driver output is coupled by a probe coupling network 52 to the antenna probe 20 extending within the bin 18. When the probe driver 46 is enabled, the high frequency oscillatory signal originally generated by the sensing oscillator 44 is imposed on the antenna probe 20. If no material contacts the antenna probe 20, the output from the enabled probe driver 46 appears as the open output of the dummy driver 48 when the latter is enabled. However, if material contacts the antenna probe 20 within the bin 18, the material provides a capacitive and/or resistive load between the antenna probe and ground, represented by the structure of the bin 18 with the result that, during the portion of the switching oscillator output cycle during which the probe driver 46 is enabled, greater current is drawn from the power supply 42 by the sensing oscillator 44.

The increased draw of current, in the form of a dc square wave of the frequency of the switching oscillator 50, from the power supply by the sensing oscillator 44 when the oscillator's amplified signal is applied to the antenna probe 20 in the presence of material providing a load path between the antenna and the bin 18 is effectively communicated along the lead line 14 to the control unit 12 as a data signal indicating the presence of such material at the antenna probe. The square wave sensing signal is amplified by a signal amplifier 54 whose output is communicated to a signal amplitude detector 56. Output from the detector 56 is a constant zero with no material present at the antenna probe 20, and a positive dc voltage produced from the signal impressed on the detector reflecting material present at the antenna probe. A positive voltage level output from the detector 56 reflecting material present at the antenna probe 20 causes energization of a display in a material contact indicator 58 to indicate such material being present at the antenna probe 20.

An open wiring detector 60 monitors the lead line 14 between the control unit 12 and the sensing unit 16, and provides a non-zero voltage level output if the lead line connection is open.

Output signals from both the signal amplitude detector 56 and the open wiring detector 60 are applied to relay control logic 62 which controls the operation of an output relay 64. The relay logic 62 effectively provides an enabling signal to the output relay 64 when the control unit 12 is "informed" that conditions at the bin 18 are suitable for one or another type operation to take place. For example, in one configuration, an output signal from the amplitude detector 56 indicating that no material is present at the level of the antenna probe 20 within the bin 18 may result in the control logic 62 providing a signal permitting energization of the output relay 64 operating effectively as a switch to permit the addition of material to the bin by means of the material feed system 28, for example. An output signal from the detector 56 indicating that material is present at the level of the probe 20 within the bin 18 may yield no enabling output signal from the logic 62, whereby the output relay 64 does not permit operation of the feed system 28. Alternatively, the relay control logic 62 may be selectively configured to permit energization of the output relay 64 only upon the detection of material in the bin 18 at the level of the antenna probe 20. Such a configuration of the control logic 62 may be utilized, for example, where the output relay 64 limits operation of the bin door 26 which would be permitted to open only when the level of material in the bin 18 was sufficiently high, that is, up to the level of the antenna probe 20. In either configuration, detection by the open wiring detector 60 that the communication line 14 is open results in the control logic 62 not providing an energizing signal to the relay 64, thereby preventing operation of any peripheral equipment while the sensing unit 16 is not able to communicate with the control unit 12.

An optional time delay 66 may be interposed between the logic 62 and the relay 64 to accommodate transient circumstances which are not intended to effect changes in the status of the output relay. For example, momentary splashing of material within the bin 18 with temporary contact of the antenna probe 20, although the "calm" level of the material is below that of the probe, would not effect the enabling of the relay 64 if the time delay 66 is set to delay effective application of the logic output signal to the relay for a sufficiently long time period.

Figure 4A:
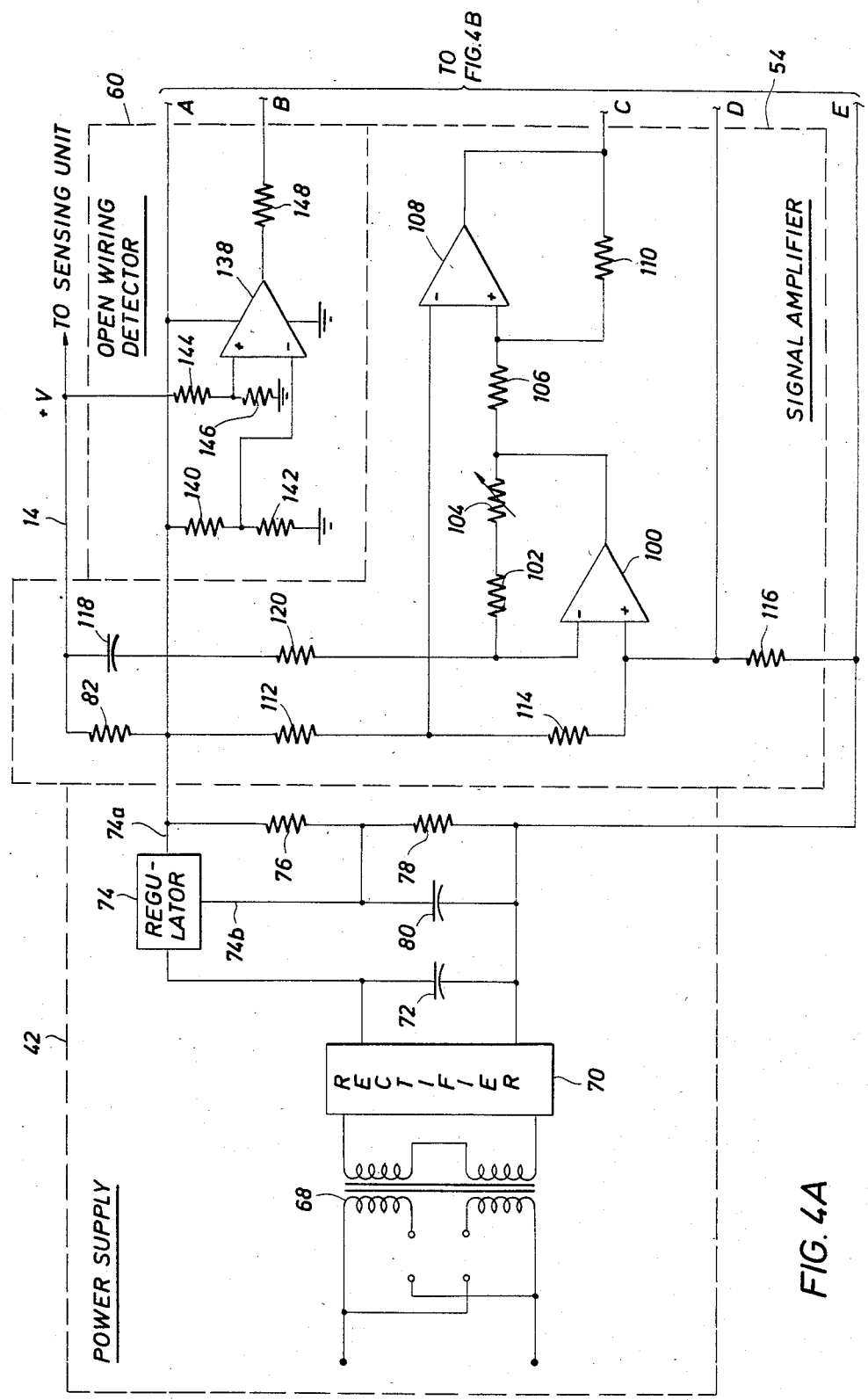
FIGS. 4A and 4B together provide a schematic diagram of the electrical circuitry employed in a control unit of the present invention with the circuitry continuing between FIGS. 4A and 4B at points A—A through E—E.

As illustrated in FIG. 4A, the power supply 42 includes a transformer 68 whose output is rectified by a bridge rectifier 70, for example, the ripples in the dc voltage output from the rectifier being filtered by a capacitor 72. A voltage regulator 74 receives the filtered output from the rectifier 70 to provide a fixed voltage at output 74a, whose value is determined, at least in part, by two resistors 76 and 78 arranged as a voltage divider between the regulator output 74a and ground, with a reference output 74b of the regulator connected to the center the voltage divider. Filtering by a capacitor 80 connected at the reference 74b completes the regulation process.

Figure 4B:
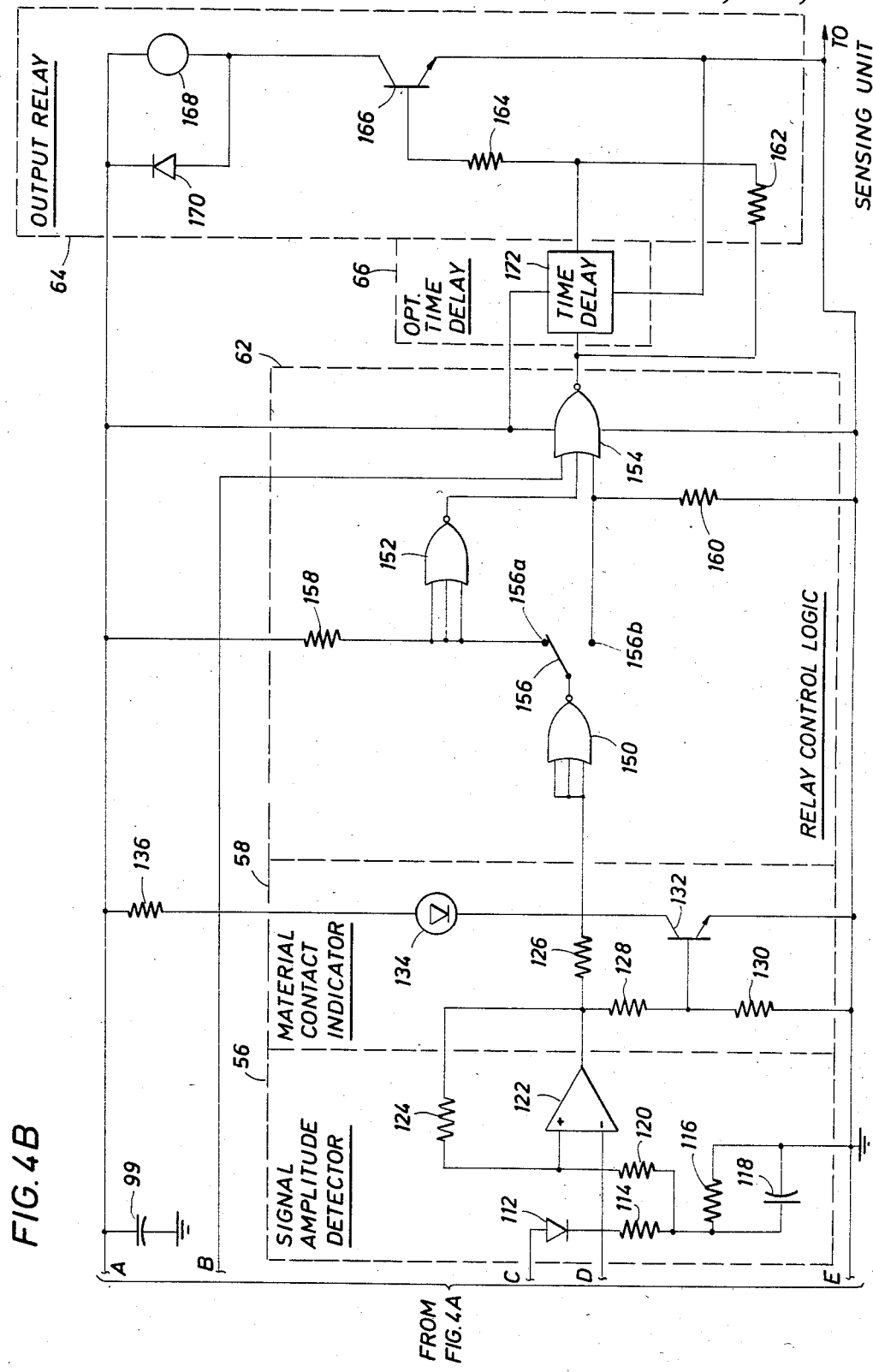

The regulated output 74a is available to provide electrical energy to operate the remainder of the control unit 12, as may be appreciated by reference to FIGS. 4A and 4B. However, the regulated voltage 74a is applied to a resistor 82 to power the remote sensing unit 16 by means of the communication lead line 14 (which includes the ground connection). The voltage drop across the resistor 82 to +V depends on the quiescent current drawn by the sensor unit 16, and further varies in response to the sensor unit detecting the presence of material at the probe 20, as discussed further hereinafter.

Figure 3:
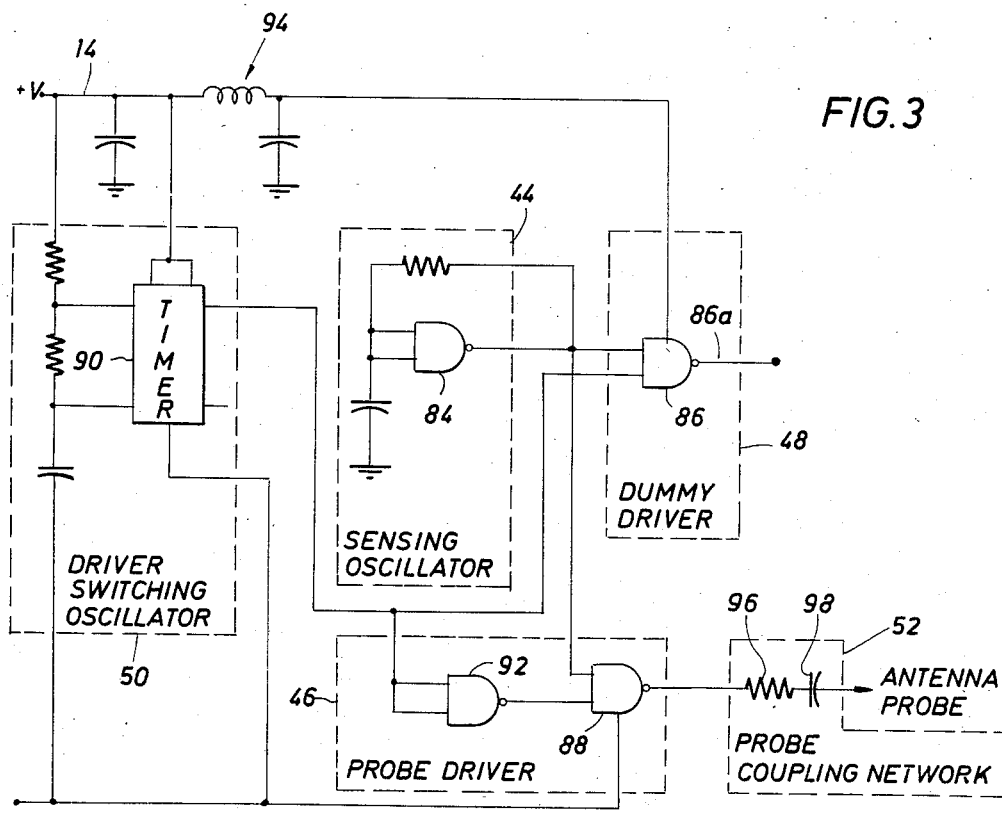
FIG. 3 is a schematic diagram of the electrical circuitry employed in a sensing unit of the present invention.

Details of the sensing unit 16 may be appreciated by reference to FIG. 3, wherein the sensing oscillator 44 is shown as comprising a NAND gate 84 as part of a standard oscillator circuit. Output from the sensing oscillator 44 is communicated to an input of a NAND gate 86 of the dummy driver 48, and to an input of a NAND gate 88 of the probe driver 46. Each of the NAND gates 86 and 88 generate an output signal of frequency equal to that of the input signal from the sensing oscillator 44 only when a non-zero signal is received at the other input to the respective gate. Such a second signal is provided to the second inputs of the driver gates 86 and 88 by the driver switching oscillator 50, which is shown as a free running multivibrator with a timer 90 which sets the frequency of the oscillator output. The output signal from the driver switching oscillator 50 is a square wave, oscillating between zero and +V, at a relatively low frequency, 60 Hz for example. The sensing oscillator output is a square wave oscillating between zero and +V at a relatively high frequency, 100 kHz for example. Application of these two signals to the input terminals of a NAND gate, such as gate 86 or gate 88, provides an output from the gate for half of each cycle of the switching oscillator signal, during which the gate output is a square wave oscillating between zero and +V at the frequency of the sensing oscillator output; during the other half cycle of the switching oscillator output signal, the gate output is constant. Consequently, each of the drivers 46 and 48 provides an output which is constant during a half cycle at the lower, switching oscillator, frequency, and which fluctuates between zero and +V at the higher, sensing oscillator output frequency during the other half cycle of the switching oscillator signal.

A NAND gate 92 is provided between the switching oscillator 50 and one of the gates, here the probe driver 88, to invert the switching oscillator signal to make the switching oscillator signal as applied to the two gates 86 and 88 to be one hundred-eighty degrees out of phase. Consequently, while the output of the dummy driver 48 is constant, the output of the probe driver 46 is fluctuating at the higher frequency; while the dummy driver output fluctuates at the higher frequency, the probe driver output is constant. It will be appreciated that the inverter gate 92 can be placed in the dummy driver 48 rather than in the probe driver 46 to effectively achieve the same result.

Athough power connections from the communication line 14 are not shown to all of the gates in the sensing unit 16 in FIG. 3, all electrical energy to operate the components of the sensing unit is obtained from the power supply 42 by way of the lead line 14. The various gates of the sensing unit, for example, may be provided by a single, integrated circuit. An LC filter, comprising a coil and two capacitors and shown generally at 94, prevents leakage of the high frequency output of the sensing oscillator 44 back to the control unit 12.

Output from the probe driver gate 88 is applied, through a limiting resistor 96, to a capacitor 98 providing capacitive coupling to the antenna probe 20. With no material present at the antenna probe 20 in the bin 18 (FIG. 1), the antenna probe is "open," with no load connection to the bin and, consequently, no signal drain from the antenna probe. Such is effectively the case with the output 86a from the dummy driver gate 86, which is open. Consequently, with no material present at the antenna probe 20, the output from the sensing unit 16 and, therefore, the power drain from the control unit 12 along the communication line 14 is the same whether the dummy driver 48 is enabled, or the probe driver 46 is enabled to communicate its output signal to the antenna probe 20. However, with material at the antenna probe 20, a load is provided between the probe and the bin 18 so that application of the high frequency square wave signal from the enabled probe driver to the antenna probe 20 during the switching oscillator signal half cycle is accompanied by an energy drain through the antenna probe from the sensing oscillator 44, with the result that additional current is drawn by the sensing oscillator 44 from the control unit 12 along the communication line 14. During the half cycle of the switching oscillator output wherein the dummy driver 48 is enabled while the probe driver 46 is not enabled, the quiescent conditions return with no increase in current drawn from the control unit 12.

The high frequency signal provided by the sensing oscillator 44, coupled to the antenna probe 20 by the capacitor 98, enables the completion of the capacitive coupling between the antenna probe 20 and the bin 18 through material in common contact with the probe and the bin wall. Because of the coupling network 52 the probe driver 46 "sees" such a capacitive load even though the material at the probe 20 provides primarily a resistive load, with the capacitor 98 of the probe coupling network 52 further preventing shorting of the sensing unit 16 to the bin 18 through a highly conductive resistive load between the antenna probe and the bin wall. The sensing oscillator 44 provides the necessary high frequency oscillatory signal to effect a loading of the antenna probe 20 through the capacitive coupling 18, regardless of the nature of the material at the probe providing such a loading.

The dummy driver 48 serves to balance the quiescent current from the control unit 12 so that, with no material present at the antenna probe 20, there is a level, quiescent current drawn from the control unit to the sensing unit 16. With material in the bin 18 at the antenna probe 20, additional current is drawn from the control unit 12 by the sensing unit 16 during the half cycles of the switching oscillator output that the probe driver 46 is enabled, resulting in a fluctuating, essentially square wave current of the frequency of the switching oscillator output signal superimposed on the quiescent current from the control unit. During the troughs of the square wave current drawn in response to material at the antenna probe 20, the current signal at the control unit to the sensing unit is essentially the same as the quiescent current. Consequently, the presence of fluctuations at the switching oscillator frequency in the electrical energy provided to the sensing unit 16 by the control unit 12 along the communication line 14 indicates the presence of material at the antenna probe 20, with the amplitude of the fluctuating signal being affected by the size, or nature, of the load between the antenna probe 20 and the bin 18.

In the signal amplifier 54 of the control unit 12 (FIG. 4A), the voltage drop across the loading resistor 82 is constant with no material at the probe 20. Under such quiescent conditions, the voltage drop across that resistor is typically approximately ten percent of the regulator output 74a, and with a few milliamperes of current drawn through the resistor for powering the sensing unit 16. With material detected at the antenna probe 20, the fluctuating dc voltage signal is superimposed across the load resistor 82, thereby varying the $+V$ voltage on the lead line 14, the fluctuations through the load resistor being in the form of a square wave of frequency equal to the switching oscillator output in the sensing unit 16, and with a varying current typically of a fraction of a milliampere through the resistor 82. A capacitor 99 (FIG. 4B) between the regulator output 74a and ground further insures that the voltage at the output 74a remains ripple-free.

The signal amplifier 54 includes an operational amplifier 100 equipped with a feedback loop to the amplifier negative input including a limiting resistor 102 and a variable resistor 104 to provide an adjustable gain amplifier, whose output is communicated, through another connecting resistor 106, to the positive input of a second operational amplifier 108 utilized as a comparator. A feedback loop to the positive terminal of the second operational amplifier 108 includes a resistor 110. A voltage divider comprising three resistors 112, 114 and 116 between the regulator output 74a and ground establishes the bias, or reference, points of the two operational amplifiers 100 and 108.

The feedback loop to the operational amplifier 100 maintains the dc component on the negative input to that amplifier equal to the constant input to the positive terminal of that amplifier. The negative terminal is also connected, through a coupling capacitor 118 and a resistor 120, to the communication line 14. With no material present at the probe 20 and a quiescent $+V$ signal on the communication line 14, there is no additional input to the negative terminal of the operation amplifier 100, since the coupling capacitor 118 removes any dc component from the signal received at the operational amplifier from the communication line 14. Under such circumstances, output from the amplifier 100 is zero, yielding a zero input to the positive terminal of the next operational amplifier 108, and a steady zero output from the signal amplifier at C. With material present at the antenna probe 20, fluctuations only in the $+V$ signal on the communication line 14 are transmitted through the coupling capacitor 118 onto the negative input to the operational amplifier 100, yielding an amplified output from that operational amplifier, at the same frequency as the switching oscillator output in the sensing unit 16. The amount of amplification in the first stage amplifier 100 is selectively established by the variable resistor 104. Generally, the voltage fluctuations input to the first operational amplifier 100 are relatively small compared to the value of $+V$ on the communication lead line 14, and the first amplifier increases the signal fluctuations to, say, 10-30 percent of $+V$.

Output from the first amplifier 100 and therefore, input to the second operational amplifier 108 has generally the shape of a sine wave. Consequently, to provide a generally sharp edged square wave output with shortened response time, the second amplifier 108 is overdriven by setting the bias at the negative terminal thereof substantially lower than the anticipated positive signal fluctuations from the first amplifier 100, and is provided with feedback to its positive terminal through the resistor 110.

The second amplifier 108 outputs a constant voltage equal to the regulated output 74a whenever the input to the amplifier is above its threshold, which is set by the voltage divider resistors 112, 114 and 116, and otherwise outputs a zero voltage. With a generally sinusoidal input from the first operational amplifier 100 to the second operational amplifier 108, the longer the input signal remains above the threshold of the operational amplifier 108, the longer the flat, positive output lasts from the second operational amplifier. Consequently, adjusting the gain of the first operational amplifier 100 by adjustment of the variable resistor 104 permits adjustment of the length of positive portion of a cycle of the output from the second operational amplifier 108. Thus, with a periodic input to the second operational amplifier 108, one may adjust the output from that amplifier, for a fixed threshold thereof, by adjustment of the variable resistor 104 to achieve a periodic, square output wave with positive-going cycles lasting from, say, a brief spike to a half cycle, or square wave shape. It will be appreciated, then, that the length of the positive portions of the square wave output from the second operational amplifier 108 to the point C depends upon the amplitude of the input to that operational amplifier which is determined, in part, by the gain setting of the first operational amplifier 100, and by the amplitude of the signal fluctuations input to the first operational amplifier 100 from the communication lead line 14 connected to the sensing unit 16, and, therefore, by the nature of the material at the probe 20. The variable resistor 104 thus serves to adjust the sensitivity of the detector and control system 10.

Output from the signal amplifier 54 at C is communicated to the signal amplitude detector 56, more particularly to a diode 112 therein, which passes the positive portions of the amplifier signal to a limiting resistor 114. The opposite end of the resistor 114 is connected to an integrator comprising a resistor 116 in parallel with a capacitor 118. With a generally square wave input to the signal amplitude detector 56 at C, the capacitor 118 charges whenever the input signal is positive, and discharges at a slower rate when the input signal goes to zero. The capacitor discharge occurs through the parallel resistor 116, and is prevented from returning to the signal amplifier 54 by the diode 112. If the positive portions of the square wave input at C are broadened, the average voltage obtained on the capacitor 118 is increased. The integrated signal voltage is communicated through a coupling resistor 120 to the positive terminal of an operational amplifier 122 utilized as a comparator with a feedback resistor 124 to the positive input. The negative input terminal to the operational amplifier 122 is biased at a level determined, in part, by the voltage divider comprising resistors 112, 114 and 116 (FIG. 4A). With no material at the probe 20, input to the signal amplitude detector 56 at C is constant zero, and the output from the comparator 122 is zero. With a generally square wave input at C indicative of material at the probe 20, the integrated signal at the positive input to the comparator 122 is a dc voltage level which, though it may display some ripple, does not fall substantially toward zero unless the input to the diode 112 becomes zero or nearly so. Values of the components of the control unit 12 may be so chosen to ensure this condition.

With material at the antenna probe 20 providing a load to the bin 18, input to the comparator 122 from the integrator comprising the resistor 116 and the capacitor 118 will be a voltage level sufficiently high to switch the comparator 122 from a zero output to a positive voltage equal to the regulator output 74a, which is sufficiently high to operate the material contact indicator 58. Again, the parameters of the signal amplitude detector 56 are so chosen to provide a positive output from the detector at a selected signal strength, determined by the variable resistor 104 of the signal amplifier 60, reflecting a selected load level between the antenna probe 20 and bin 18. However, regardless of the signal level to which the detector 56 has been adjusted to respond, the output from the amplifier 122 will be either zero voltage (in the case of no material present at the antenna probe 20, or loading by material at the antenna probe insufficient to exceed the selected loading level for a positive response from the detector 56), or a voltage level set by the regulator output 74a (reflecting material at the antenna probe sufficient to provide at least the minimum loading requirements so selected), with a very brief time of transition between these two voltage levels.

Output from the detector 56 is communicated to two connecting resistors 126 and 128, the latter of which forms a voltage divider with a resistor 130. The junction of the voltage divider between the resistors 128 and 130 is connected to the base of a transistor 132 which is connected between ground and a light emitting diode (LED) 134 and a resistor 136 in series to the regulator output 74a. With a zero output from the operational amplifier 122, the base of the transistor 132 is at zero and no current is passed by the transistor, with the result that the LED 134 passes no current and is not lit. With the output from the detector 56 at its positive voltage level (which is maintained as long as material is detected at the antenna probe 20), the voltage level of the base of the transistor 132 is raised, and sufficient current is passed through the transistor collector and emitter and, therefore, through the LED 134 to light the LED. Thus, whenever material is detected at the antenna probe 20 by the system 10, this detection is indicated by the lighting of the LED 134.

In addition to operating the material contact indicator 58 to notify the operator whether material is present at the antenna probe 20, the system 10 may also operate to energize or de-energize a peripheral system, such as the material feed system 28 or the motive system 38 operating the bin door 26 (FIG. 1). Thus, the detecting and control system 10 may be used to set limits for the operation of other systems or components. This may be accomplished, for example, by the system 10 controlling switches such as relays depending on the presence or absence of material detected at the probe 20. In the disclosed embodiment, the relay control logic 62 provides an interface between the circuitry that signals the presence of or absence of material at the antenna probe 20 and the output relay 64, which may be utilized to so control operation of a subsequent system to add material to, or remove material from, the bin 18, for example.

It may be particularly desirable and advantageous to automatically prevent operation of such subsequent, peripheral systems in the event of a break in the connecting line 14. This may be particularly true where the control unit 12, at which an operator may be present, is a considerable distance from the remote sensing unit 16. The open wiring detector 60 responds to such a break in the line 14 by providing a positive output signal to which the relay control logic 62 may also respond.

In FIG. 4A, the open wiring detector 60 is shown to include an operational amplifier 138 used as a comparator. The negative reference input of the amplifier 138 is set by a voltage divider comprising resistors 140 and 142 connected between the regulator output 174a and ground. The positive input to the amplifier 138 is determined by the signal placed on a voltage divider comprising resistors 144 and 146 connected between ground and the communication lead line 14.

As an example, resistors 140, 142 and 146 may be equal, and resistor 144 of a somewhat lesser value. Then, the reference negative terminal to the input to the amplifier 138 will be set at one-half the regulator output voltage 74a. With the connecting line 14 open, the value of +V on that line connected to the control unit 12 will be essentially equal to the fixed regulator output voltage 74a, or at least sufficiently close to that value, ensuring that the input voltage to the positive terminal of the amplifier 138 will be greater than the reference voltage to the negative terminal, which would be one-half of the fixed voltage 74a. In such case, output from the amplifier 138, communicated through a connecting resistor 148, would be equal to the regulator output 74a. With the connecting lead line 14 closed, and the sensing unit 16 drawing current through the loading resistor 82, the value of +V is less than the fixed regulated voltage level 74a as discussed hereinbefore, with the result that the voltage value to the positive input of the amplifier 138 is less than the reference voltage at the negative terminal, that is, less than one-half the value of the regulated voltage 74a in the example of the resistors as described, and the output from the amplifier 138 is zero. Therefore, a zero output from the open wiring detector 60 indicates that the connecting line 14 is closed; a positive value output at B from the open wiring detector indicates that the lead line 14 is open.

The relay control logic 62 (FIG. 4B) is shown to include three OR gates, 150, 152 and 154. If a positive voltage value, say of the size output from either the signal amplitude detector 56 or the open wiring detector 60, is input to any terminal of such an OR gate, the output from the gate is zero. Otherwise, the output from such a gate is at a set, positive voltage, here the value of the regulator output voltage 74a.

The output from the open wiring detector 60 is connected to one input terminal of the last OR gate 154. Consequently, if the lead line 14 is open, the positive voltage output from the open wiring detector 60 causes the output from the OR gate 154 to be zero, regardless of the voltage values input to the other two terminals of the OR gate. Therefore, if the control unit 12 determines that the lead line 14 to the sensing unit 16 is open, output from the relay control logic 62 is zero, that is, no enabling signal is output from the logic.

The relay control logic 62 may be placed in either of two configurations, that is, to provide an enabling output to energize subsequent systems only when material is present at the antenna probe 20, or only when material is not present at the antenna probe. Selection between these conditions, the former of which may be referred to as fail-safe high and the latter referred to as fail-safe low, is made by selectively positioning a switch 156 between terminals 156a and 156b. The switch 156 occurs at the output of the first OR gate 150, all of whose input terminals receive the output signal from the amplitude detector 56 through the connecting resistor 126. With no material detected at the antenna probe 20, output from the signal amplitude detector 56 is zero, with the zero input to the first gate 150 producing an output positive voltage level to the switch 156. Otherwise, a positive voltage input to the first gate 150 indicative of material detected at the probe 20 results in a zero voltage communicated to the switch 156.

In the fail-safe high configuration as illustrated, the output from the first gate 150 is input to each of the three input terminals of the second gate 152. The second gate 152 input terminals are shown connected between the switch terminal 156a and the regulated voltage level 74a by a control resistor 158. The positive voltage level input to the second gate 152 from the first gate 150 in the event no material is detected at the antenna probe 20 yields a zero output level from the second gate 152, which is input to another terminal of the third gate 154. The resistor 160 connects the third input to the last gate 154 to ground to insure zero voltage to that intput in the fail-safe high configuration. Thus, in the fail-safe high configuration as illustrated, if no material is detected at the antenna probe 20, the output from the relay control logic is an enabling positive voltage level (provided the lead line 14 is closed as well). A positive input to the first gate 150, indicating material detected at the antenna probe 20, yields a zero output from that gate which is input to the second gate 152 in the fail-safe high configuration, driving the voltage level of that input to zero. The resulting positive output from the second gate 152 in that instance is input to the final gate 154, yielding a zero output from the relay control logic 62.

In the fail-safe low configuration, with the switch 156 connecting the output from the first gate 150 to the lower switch terminal 156b, the first gate output is communicated directly to the third input terminal of the last gate 154, and the connection from the regulated output 74a to all three inputs of the second gate 152 maintains those inputs at a positive voltage, providing a zero level output from that gate to the second input of the last gate 154. Thus, with zero input to the first gate 150 reflecting that no material is being detected at the antenna probe 20, the positive voltage output from the first gate being input to the last gate 154 causes the output of that gate and, therefore, of the relay control logic 62, to be zero regardless of the values input to the other two terminals of the last gate 154. In such case, no enabling signal is provided by the control logic 62 to energize subsequent switching. With material detected at the antenna probe 20, the resulting positive voltage value input to the first gate 150 yields a zero input, in the fail-safe low configuration, to the third terminal of the last gate 154, permitting a positive voltage level output from the control logic to energize peripheral switching (provided, again, that the control unit 12 determines that the lead line 14 is closed).

When the switch 156 is in the fail-safe high configuration, the final terminal to the third gate 154, connected to the lower switch terminal 156b, is held at zero volts by means of the connection to ground through the resistor 160, effectively rendering that input to the last gate inoperable. When the switch 156 is connected to the lower terminal 156b in the fail-safe low configuration, all input terminals to the second gate 152, which is intended in that instance to be ineffective in the circuit, are maintained at a positive voltage set by the resistor 158 connected to the regulator output 74a. Thus, a positive voltage is maintained on the inputs to this second gate 152 in the fail-safe low configuration to ensure output from the second gate being zero. In the fail-safe high configuration, positive voltage output from the second gate 150 through the switch 156 still provides a positive voltage input to the second gate 152; zero voltage output from the first gate 150 through the switch 156 causes a drop in the voltage applied to the second gate input terminals of the second gate 152 through the resistor 158 below the threshold value required to produce an output voltage of zero from the second gate.

It will be appreciated that the second gate 152 operates effectively as an inverter so that including the second gate in the circuit or not allows the operator to choose between two opposite results of detecting material present at the antenna probe 20.

Output from the relay control logic 62 is zero whenever material is detected at the antenna probe in the fail-safe high configuration, and whenever material is not detected in the fail-safe low configuration. In either configuration, the logic output signal is zero if the connecting lead line 14 is determined to be open. Otherwise, with the connecting lead line 14 determined to be closed, output from the relay control logic is a positive, enabling value whenever, in the fail-safe high configuration, material is not detected at the antenna probe 20, and, in the fail-safe low configuration, material is detected at the antenna probe. In the fail-safe high configuration, if the relay control logic output is zero, the operator may determine if such is the result of material being detected at the antenna probe 20 or of a break in the lead line 14, by noting whether the LED 134 is lit: if the LED is lit, material is being detected at the antenna probe and the lead line 14 is intact; if the LED is not lit, there is no detection of material at the antenna probe (although detectable material may be present there), and the lead line 14 is open.

Output from the relay control logic 62 is communicated to series resistors 162 and 164 connected to the base of a transistor 166. The emitter and collector of the transistor 166 are connected between ground and the regulated voltage output 74a through a relay 168, respectively. With a zero output from the relay control logic 62, the base of the transistor 166 is at zero voltage, and no current is drawn through the resistor, with the result that the relay 168 is not energized. When a positive output voltage is provided by the relay control logic 62, the voltage level of the base of the transistor 166 is raised, with the result that current is drawn through the emitter and collector of the transistor and, therefore, through the relay 168, energizing the relay. When the relay 168 is energized, it may operate to close a peripheral circuit, such as the circuit providing power to the motor 34 of the feed system 28 to add material to the bin 18, or a circuit to provide power to the fluid pressure system 38 to open the bin door 26 to permit removal of material from the bin.

A diode 170 is provided in parallel with the relay 168 to suppress large impulse voltage spikes which may occur when current to the relay 168 is broken as output from the relay control logic goes to zero. Otherwise, the transistor 166 might be damaged by such voltage spikes.

An optional time delay 66 may be provided to delay the response of the relay 168 to changes in the output signal from the relay control logic 62. Thus, the time delay 66 may be selectively adjustable to provide a selected delay and response time of the relay 168 to a rise in voltage of the relay control logic output from zero to its positive enabling output signal, as well as a delay in the relay response time to the output of the control logic 62 going to zero to de-energize the relay. Such time delay circuits are known in the art, and will only be considered generally herein. The time delay circuitry 66 includes a time delay 172 powered by connections between ground and the regulated output signal 74a. The output from the relay control logic 62 is input to the time delay 172, whose output is connected between the resistors 162 and 164, placing the time delay 172 in parallel with the first resistor 162. The output of the time delay 172 is thus a signal of value zero, or a signal of value equal to the regulated output voltage 74a as well as transition values as the time delay shifts between zero and the value of 74a.

The timer 172 is a programmable oscillator timer including an oscillator whose frequency can be selectively set. Also, the counting stages of the timer can be selected to cause the counter to count down in virtually any desired time period before the output from the timer 172 changes in response to a change in input to the timer, whether the change is an increase or a decrease in voltage.

The purpose of the time delay is to allow the detector and control system 10 to remain in one configuration without changing in the presence of transitional conditions. For example, if the material in the bin 18 is liquid, and, with the liquid calm, the level of the liquid is below that of the antenna probe 20, splashes or waves of the liquid up to the antenna probe 20, which might provide a potential loading connection between the antenna probe and the bin wall, may be accommodated with the time delay 172 without changing the configuration of the relay 168 where the momentary contact of the antenna probe by the material ceases before the time delay completes its countdown to change the status of the relay.

The material contact indicator 58 is available to indicate the presence of detectable material at the antenna probe 20, provided the connecting lead line 14 is closed. The relay control logic 62 serves to interface with the output relay 64, providing necessary switching and the ability to select between the fail-safe high and fail-safe low configurations. The control logic 64 thus enables the detection and control system 10 to operate in a safe manner, rendering inoperable peripheral systems controlled by the system 10 under certain conditions, including the loss of sensing ability in the event of a break in the lead line 14 connecting the sensing unit 16 with the control unit 12. Similarly, in the fail-safe low configuration, an indication of no material present at the antenna probe may be interpreted as an indication of insufficient material in the bin 18, with the result that no enabling signal is provided to allow the bin door 26 to be opened to remove material from the bin. In the fail-safe high configuration, a signal representing material detected at the level of the antenna probe 20 results in no enabling signal provided by control logic 62 to permit operation of the feed system 28 to add material to the bin 18.

As noted hereinbefore, the sensitivity of the detector and control apparatus 10 can be selectively adjusted by adjustment of the variable resistor 104 to vary the gain of the amplifier 100. For a given sensing signal from the sensing unit 16, adjustment of the variable resistor 104 affects the length of positive pulses of the output signal from the second amplifier 108 and, therefore, the voltage level input to the positive input terminal of the comparator 122 of the signal amplitude detector 56. By so adjusting the variable resistor 104, the operator chooses a load level, or threshold, that may be provided by material in the bin 18 contacting the antenna probe 20 just sufficient to provide a positive output signal from the comparator 122, that is, to be detected by the system 10 with the presence of such material at the antenna probe 20 revealed by operation of the material contact indicator 158, specifically the LED 134, and to provide a zero output from the first gate 150 of the relay control logic 62. The sensitivity may be adjusted with the container empty, or at least with no material in contact with the antenna probe 20. Then, the resistor 104 is adjusted so that the material contact indicator 58 and the relay control logic 62 will respond when the antenna probe is touched in common with the container wall. In particular, the contact between the probe 20 and the container wall to set the resistor 104 may be by the kind of material to be detected.

The selectability of sensitivity of the present invention may be particularly advantageous wherein two or more types of material are present in the container, such as the bin 18, with the materials generally distributed one on top of the other. For example, if the material container is an oil and water separator, the present invention may be utilized to detect the level of water in the combination of oil and water. When multiple, "stacked" materials are to be within the container and a level between them detected, the detection and control system 10 must be sensitive to respond to one of the materials and be insensitive, or unresponsive, to the other material. In the case of oil and water, for example, the oil floating on the water has a lower conductance and dielectric constant than the water. Consequently, with oil in contact with the antenna probe 20, the sensitivity of the system 10 may be adjusted so that the system will not detect and respond to the oil. Such an adjustment of the variable resistor 104 may be made so that, with water at the antenna probe 20, the system will still respond and detect the presence of the water. Thereafter, as the separation between the oil and water rises and falls relative to the location of the antenna probe 20, the detection and control system 10 will respond accordingly, with the material contact indicator 58 and the relay control logic 62 responding to the detection of water at the antenna probe, but providing zero output signals when only oil is present at the antenna probe.

Since the only signal needed from the sensing unit 16 to indicate to the control unit 12 the presence of material at the antenna probe 20 is the increase of dc current in the lead line 14 in the form of low frequency fluctuations, detected as voltage variations at the control unit, the lead line may be constructed of ordinary electrical communications cable, shielded only to protect the cable from mechanical damage. Thus, there is no need to utilize electrically shielded cable, such as coaxial cable, to avoid noise problems, for example, that might be experienced in the case of high frequency detection signals. Additionally, the lead line 14 may be substantially longer than in the case of high frequency signal connections, allowing the control unit 16 to be removed a considerable distance from the remote sensing unit 12. Thus, one operator at a central location, for example, may monitor a mulitplicity of control units 12 connected to an array of remote sensing units 16 located at containers or the like distributed over a wide area. Additionally, the present invention prevents operation of systems by the detection and control system 10, for example, in the event that the electrical connection 14 between the sensing unit 16 and the control unit 12 is open whereby the operator has lost the ability to determine whether material is present at the antenna probe 20. Further, a single container may be fitted with two or more antenna probes, located at different levels, whereby the level of material within the container may be more fully "tracked" as the level rises and falls relative to the various antenna probes. Such an application of multiple antenna probes may also be utilized where two or more types of materials are "stacked" within the container, with the interface level or levels among the materials rising and lowering as in the example discussed hereinbefore in the matter of an oil and water separator. Each antenna probe may have its sensitivity individually adjusted to respond to one or the other of the materials, or more than one of the materials, present in the container. For each antenna probe utilized in a given container, there is an additional control unit monitored by the operator, for example.

It will be appreciated that the output relay 64, and specifically the relay 168, may be connected to directly turn on or off additional electric circuitry. For example, operation of the relay 168 may directly open or close a switch (not shown) directly in the electrical circuitry supplying power to the material feed system 28 (FIG. 1). Alternatively, the relay 168 may operate to open or close a switch in a circuit not directly in the power supply circuit of the material feed system 28, but which must be completed, or closed, in order that the power supply circuit itself be closed. In the latter case, the control system 12, through the relay 168, permits operation of the peripheral material feed system 28 when the relay 168 is energized, but does not directly turn on the feed system. However, when the control unit 12 de-energizes the relay 168 in response to the appropriate signal from the sensing unit 16, or in the event of a break in the connector line 14, the peripheral system would be turned off by the opening of the circuit so controlled by the relay 168. Thus, the system 10 would, in that case, permit operation of the peripheral system, such as the material feed system 28, under selected circumstances, and would prevent operation of the peripheral system under other selected circumstances, but actual operation of the peripheral system would be conducted by the operator or some other force.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. Apparatus for detecting the presence or absence of material at a location comprising sensing means, including:
   a. oscillator means for providing an oscillatory output signal;
   b. reference means, for receiving said oscillatory output signal and providing a reference;
   c. sensor means, including antenna probe means for positioning at said location, and for receiving said oscillatory output signal;
   d. switching means for alternately permitting said oscillatory output signal to be applied to said reference means and to said antenna probe means;
   e. an electrical energy source for providing electrical energy for application to said oscillator means by connection means whereby the absence of material, to be sensed, at said location, is accompanied by substantially the same rate of electrical energy consumption by said oscillator means when said oscillatory output signal is applied to said antenna probe means as when said signal is applied to said reference, and, with such material present at said location, electrical energy is consumed by said oscillator means at a greater rate when said signal is applied to said antenna probe means compared to when said signal is applied to said reference; and
   f. means for detecting a change in the rate of energy consumption from said electrical power source whereby the presence or absence of said material at said location may be determined.

2. Apparatus as defined in claim 1 wherein:
   a. said sensor means further comprises gate means for receiving said oscillatory output signal and operational by said switching means for periodically providing an output of frequency equal to that of said oscillatory signal for forwarding to said antenna probe means; and
   b. said reference means further comprises gate means for receiving said oscillatory output signal and operable by said switching means for periodically providing an output of frequency equal to that of said oscillatory signal for forwarding to said reference.

3. Apparatus as defined in claim 2 wherein said switching means comprises an oscillator whose output is communicated to said sensor means gate means and to said reference means gate means.

4. Apparatus as defined in claim 3 wherein said switching means oscillator output is a constant frequency signal, and said oscillatory output signal has a frequency higher than said frequency of said switching means oscillator output.

5. Apparatus as defined in claim 1 wherein said means for detecting a change in rate of energy consumption comprises:
   a. amplitude detector for providing a voltage level in response to an increased rate of electrical energy consumption by said oscillator means with material present at said location; and
   b. indicator means for indicating the presence or absence of material at said location as determined by said amplitude detector.

6. Apparatus as defined in claim 5 further comprising open connection detector means for sensing a lack of energy consumption by said oscillator means indicative of a break in said connection means.

7. Apparatus as defined in claim 6 further comprising logic means for providing an output control signal which may be zero or non-zero, and switch means for selectively configuring said logic means in a first configuration in which said control signal is zero when material is detected at said antenna probe means, and may be non-zero otherwise, and a second configuration in which said output control signal may be non-zero when material is detected at said antenna probe means, but which is zero otherwise.

8. Apparatus as defined in claim 7 wherein said output control signal is provided by said logic means as zero in either said first configuration or said second configuration when said open connection detector means determines that said connection means is open.

9. Apparatus as defined in claim 7 further comprising relay means for receiving said output control signal from said logic means and operating in response to said control signal.

10. Apparatus as defined in claim 9 further comprising time delay means for delaying the change in operating of said relay means in response to said control signal changing between zero and non-zero.

11. Apparatus as defined in claim 5 further comprising sensitivity adjustment means for selectively adjusting the sensitivity of said means for detecting a change in the rate of energy consumption from said electric power source.

12. Apparatus as defined in claim 1 further comprising sensitivity adjustment means for selectively adjusting the sensitivity of said means for detecting a change in the rate of energy consumption from said electric power source.

13. Apparatus as defined in claim 1 further comprising open connection detector means for sensing a lack of energy consumption by said oscillator means indicative of a break in said connection means.

14. Apparatus as defined in claim 1 further comprising logic means for providing an output control signal which may be zero or non-zero, and switch means for selectively configuring said logic means in a first configuration in which said control signal is zero when material is detected at said antenna probe means, and may be non-zero otherwise, and a second configuration in which said output control signal may be non-zero when material is detected at said antenna probe means, but which is zero otherwise.

15. Apparatus as defined in claim 14 further comprising relay means for receiving said output control signal from said logic means and operating in response to said control signal.

16. Apparatus as defined in claim 15 further comprising time delay means for delaying the change in operating of said relay means in response to said control signal changing between zero and non-zero.

17. Apparatus as defined in claim 1 further comprising control means for operating in response to said means for detecting a change in the rate of energy consumption from said electric power source to provide an output signal depending, at least in part, on the detected presence or absence of material at said location.

18. Apparatus as defined in claim 1 wherein said oscillator means, reference means, sensor means and switching means are positioned remote from said energy source and means for detecting a change in the rate of energy consumption, which are connected to said oscillator means, reference means, sensor means and switching means by said connection means.

19. A system for monitoring the level of material in a container comprising:
   a. sensing means for locating at said container, including:
      i. a first oscillator for providing a first oscillatory signal of a first frequency;
      ii. a second oscillator for providing a second oscillatory signal of a second frequency smaller than said first frequency;
      iii. first gate means, and antenna probe means for positioning at a location within such container and couped to the output of said first gate means; and
      iv. second gate means with an open output for providing a reference;
      v. wherein said first oscillatory signal is communicated to first inputs of each of said first and second gates, said second oscillatory signal is communicated to a second input of one of said first and second gates and to an inverter, the output of said inverter being communicated to the second input of the other of said first and second gates, whereby said first and second gates alternately provide an output signal of said first frequency with the output signal from said first gate being communicated to said antenna probe coupled thereto; and
   b. control means, connected to said sensing means by conductor means, and including:
      i. electrical power means for providing an electrical voltage communicated along said conductor means to said sensing means;
      ii. detector means for responding to changes in the electrical current drawn by said sensing means from said power means due to the presence of material at said antenna probe means compared to the electrical current so drawn by said sensing means from said power means in the absence of such material at said antenna probe means; and
      iii. indicator means for displaying information indicative of the presence or absence of material at said antenna probe means as determined by said detector means.

20. A system as defined in claim 19 wherein said control means further comprises open connection detector means for sensing the lack of electrical energy communicated between said power means and said sensing means associated with the opening of said conductor means.

21. Apparatus as defined in claim 20 wherein said control means further comprises:
   a. logic means for responding to the presence or absence of material at said antenna probe means as determined by said detector means, and the detection of the opening of said conductor means between said control means and said sensing means, to provide an output signal; and
   b. output means, for receiving said output signal of said logic means, to control the energizing of means for affecting the level of material in such container.

22. Apparatus as defined in claim 21 wherein said control means further comprises time delay means for receiving said output signal from said logic means and delaying change in the operation of said output means to so effect change in energization of means for affecting the level of material in said container.

23. Apparatus as defined in claim 19 wherein said control means further comprises:
   a. logic means for responding to the presence or absence of material at said antenna probe means as determined by said detector means; and
   b. output means, for receiving said output signal of said logic means, to control the energizing of means for affecting the level of material in such container.

24. Apparatus as defined in claim 23 wherein said control means further comprises time delay means for receiving said output signal from said logic means and delaying change in the operation of said output means to so effect change in energization of means for affecting the level of material in said container.

25. Apparatus as defined in claim 19 wherein said control means further comprises sensitivity adjustment means for selectively adjusting the sensitivity of response of said detector means for responding to changes in the electrical current drawn by said sensing means from said power means.

26. A material detector and control system comprising:
   a. sensing means, including:
      i. a signal generator for generating a sensing signal;
      ii. first and second drivers for receiving said sensing signal;
      iii. an antenna probe for positioning at a predetermined location where the presence or absence of material is to be detected, said antenna probe being coupled to said first driver whereby an output signal from said first driver may be impressed on said antenna probe; and
      iv. switch means for alternately enabling said first an second drivers at a switching frequency for providing output signals in response to said sensing signal received thereby, respectively;
      v. wherein said second driver operates as a reference when enabled, by said switching means, to provide an output signal in response to said sensing signal so that, with no such material present at said antenna probe, the rate of electrical energy consumption by said signal generator is substantially constant, and, with detectable material at said antenna probe, said energy consumption fluctuates as said switching means alternately enables said first and second drivers, said rate of energy consumption thus providing a data signal indicating the presence or absence of material at said antenna probe; and
   b. control means comprising:
      i. electrical power means, in communication with said sensing means by connector means, for providing electrical energy for consumption by said sensing means such that said data signal comprises fluctuations in the rate of energy transmission by said connector means with material at said antenna probe, and comprises a substantially constant rate of energy transmission by said connector means when no detectable material is present at said antenna probe;
      ii. amplifier means coupled to said connector means for receiving said data signal and providing an amplifier output signal varying between two voltage levels at said switching frequency when material is detected at said antenna probe, and which is otherwise of constant value;
      iii. amplitude detector means for receiving and integrating said amplifier output signal, comparing the integration of said signal to a reference and providing an output voltage level whenever said reference is exceeded, signaling detection of the presence of material at said antenna probe;
      iv. indicator means, in communication with said amplitude detector means, for providing a display indicating the presence of material at said antenna probe whenever said output voltage level is provided by said amplitude detector means;
      v. logic means, in communication with said amplitude detector means, for providing a logic output signal depending on said amplitude detector means output; and
      vi. relay means for receiving said logic output signal as an enabling signal whereby said relay means provides switching control means to open or close peripheral circuitry in response to said logic output signal.

27. A system as defined in claim 26 wherein said control means further comprises open connection detector means coupled to said connector means for determining whether said connector means between said control means and said sensing means is closed, and providing an open connection detector means output signal to said logic means whereby said logic means fails to provide an enabling signal to said relay means when said open connection detector means determines that said connector means is open.

28. A system as defined in claim 27 wherein said logic means may be selectively moved between a first configuration, in which said logic means does not provide an enabling signal to said relay means when said amplitude detector means signals the detection of the presence of material at said antenna probe, and a second configuration, in which said logic means does not provide an enabling signal to said relay means when said amplitude detector means does not signal the detection of the presence of material at said antenna probe.

29. A system as defined in claim 28 wherein said control means further comprises sensitivity adjustment means for selectively adjusting the response of said amplifier means to said data signal to vary the integration of said amplifier output signal by said amplitude detector means in response to change in energy consumption rate by said sensing means in the presence of material at said antenna probe.

30. A system as defined in claim 28 wherein said control means further comprises delay means for selectively delaying the response of said relay means to change in said enabling signal from said logic means.

31. A system as defined in claim 26 wherein said logic means may be selectively moved between a first configuration, in which said logic means does not provide an enabling signal to said relay means when said amplitude detector means signals the detection of the presence of material at said antenna probe means, and a second configuration, in which said logic means does not provide an output enabling signal to said relay means when said amplitude detector means does not signal the detection of the presence of material at said antenna probe means.

32. A system as defined in claim 26 wherein said control means further comprises sensitivity adjustment means for selectively adjusting the response of said amplifier means to said data signal to vary the integration of said amplifier output signal by said amplitude detector means in response to change in energy consumption rate by said sensing means in the presence of material at said antenna probe.

33. A system as defined in claim 26 wherein said control means further comprises delay means for selectively delaying the response of said relay means to change in said enabling signal from said logic means.

34. A system as defined in claim 26 wherein said signal generator comprises an oscillator for providing said sensing signal as a square wave signal of frequency higher than said switching frequency.

35. A system as defined in claim 34 further comprising capacitive coupling for so coupling said antenna probe to said first driver.

36. A system as defined in claim 26 wherein said switching means comprises an oscillator for providing an enabling signal to said first and second drivers as a square wave of said switching frequency whereby each such driver may be enabled to provide an output signal when receiving one-half cycle of said enabling signal square wave, and an inverter by which said square wave is provided to one or the other of said first and second drivers so that while one such driver receives one half of said square wave cycle, the other of said drivers receives the other half to so alternately enable said drivers.

37. A method of monitoring the quantity of material at a location comprising the following steps:
  a. providing an antenna probe at the location, coupled to a probe driver;
  b. providing a dummy driver serving as a reference;
  c. providing an oscillator for generating an oscillatory sensing signal at a first frequency and communicating the oscillatory signal to each of the drivers;
  d. periodically and alternately enabling each of the drivers at a second frequency to output a signal of the first frequency;
  e. monitoring the rate of electrical energy consumption by the oscillator to detect fluctuations of increased energy consumption by the oscillator as the probe driver is enabled to output its signal to the antenna probe in the presence of material at the antenna probe, and providing an output amplifier signal at the second frequency in response to such detection of material at the antenna probe;
  f. integrating the output amplifier signal and comparing the integration level with a reference level and, whenever the integration level exceeds the reference level, providing an output voltage level.

38. A method as defined in claim 37 further comprising the following additional steps:
  a. applying said output voltage level to logic circuitry; and
  b. providing an enabling voltage by the logic circuitry to control peripheral equipment depending upon the presence or absence of detectable material at said antenna probe.

39. A method as defined in claim 38 further comprising the step of selectively configuring said logic circuitry to either provide said enabling voltage only when material is detected at said antenna probe or only when material is not detected at said antenna probe.

40. A method as defined in claim 39 further comprising the step of monitoring the energy consumption by the oscillator to monitor the integrity of the connection between the oscillator and its power source, and, in the event of a determination of a break in that connection, providing a signal to operate the logic circuitry to prevent presentation of the enabling voltage.

41. A method as defined in claim 38 further comprising the step of monitoring the energy consumption by the oscillator to monitor the integrity of the connection between the oscillator and its power source, and, in the event of a determination of a break in that connection, providing a signal to operate the logic circuitry to prevent presentation of the enabling voltage.

42. A method as defined in claim 37 further comprising the step of selectively adjusting the sensitivity of the amplifier to provide the output amplifier signal to achieve a selected integration level in response to a selected amplitude of fluctuations in energy consumption by the oscillator in conjunction with the presence of material at the antenna probe.

43. A method as defined in claim 37 further comprising the step of applying said output voltage level to an indicator to actuate the indicator to reveal the detection of material at the antenna probe.

* * * * *

UNITED STATES PATENT AND TRADEMARK OFFICE
CERTIFICATE OF CORRECTION

PATENT NO. : 4,589,281
DATED : May 20, 1986
INVENTOR(S) : Joe L. Aldrich

It is certified that error appears in the above—identified patent and that said Letters Patent is hereby corrected as shown below:

Column 19, line 9, before "amplitude" insert --an--.

Column 20, line 31, delete "couped" and insert therefor --coupled--.

Column 21, line 53, delete "an" and insert therefor --and--.

Signed and Sealed this

Twenty-third Day of September 1986

[SEAL]

Attest:

DONALD J. QUIGG

Attesting Officer

Commissioner of Patents and Trademarks